United States Patent
Van Garsse (10) Patent No.: US 11,423,274 B2
(45) Date of Patent: Aug. 23, 2022

(54) LEATHER WITH SKIN TEXTURE HAVING AN IDENTIFICATION CODE

(71) Applicant: AGFA NV, Mortsel (BE)

(72) Inventor: Joris Van Garsse, Mortsel (BE)

(73) Assignee: AGFA NV, Mortsel (BE)

( * ) Notice: Subject to any disclaimer, the term of this patent is extended or adjusted under 35 U.S.C. 154(b) by 0 days.

(21) Appl. No.: 17/416,696

(22) PCT Filed: Dec. 13, 2019

(86) PCT No.: PCT/EP2019/085186
§ 371 (c)(1),
(2) Date: Jun. 21, 2021

(87) PCT Pub. No.: WO2020/126941
PCT Pub. Date: Jun. 25, 2020

(65) Prior Publication Data
US 2022/0067470 A1 Mar. 3, 2022

(30) Foreign Application Priority Data
Dec. 19, 2018 (EP) ..................................... 18213816

(51) Int. Cl.
*G06K 19/06* (2006.01)
*C14B 1/56* (2006.01)
*C14C 11/00* (2006.01)

(52) U.S. Cl.
CPC .......... *G06K 19/06103* (2013.01); *C14B 1/56* (2013.01); *C14C 11/003* (2013.01); *G06K 19/06037* (2013.01)

(58) Field of Classification Search
CPC ....... G06K 19/06159; G06K 19/06037; G06K 2019/06271; C14B 1/56

USPC .................................................. 235/490, 494
See application file for complete search history.

(56) References Cited

U.S. PATENT DOCUMENTS

2017/0132465 A1* 5/2017 Kutter .................. G06K 7/1417
2020/0101783 A1* 4/2020 Jancart ................ B41M 5/0047

FOREIGN PATENT DOCUMENTS

| EP | 1947592 A1 | 7/2008 |
| EP | 3388491 A1 | 10/2018 |
| WO | 03/038132 A1 | 5/2003 |
| WO | 2006/100055 A1 | 9/2006 |
| WO | 2017/203425 A1 | 11/2017 |

(Continued)

OTHER PUBLICATIONS

International Search Report dated May 7, 2020 relating to PCT/EP2019/085186, 4 pages.

(Continued)

*Primary Examiner* — Paultep Savusdiphol
(74) *Attorney, Agent, or Firm* — Leydig, Voit & Mayer, Ltd.

(57) ABSTRACT

A natural leather embossed with a skin texture for authenticating said natural leather with an identification code comprising the steps: —applying a protective top-coat on said natural leather; and —selecting an identification code and converting said identification code to a plurality of locations; and —forming a skin texture with higher up elements and lower located elements; arranged according said plurality of locations; and —embossing said skin texture in said protective top-coat.

17 Claims, 4 Drawing Sheets

(56) References Cited

FOREIGN PATENT DOCUMENTS

WO  2017/207524 A1  12/2017
WO  WO 2018/189002 A1  10/2018

OTHER PUBLICATIONS

Written Opinion dated May 7, 2020 relating to PCT/EP2019/085186, 6 pages.

\* cited by examiner

LEATHER WITH SKIN TEXTURE HAVING AN IDENTIFICATION CODE

REFERENCE TO RELATED APPLICATIONS

This application is a 371 National Stage Application of PCT/EP2019/085186, filed Dec. 13, 2019, which claims the benefit of European Application No. 18213816.4, filed Dec. 19, 2018, the contents of which are incorporated by reference herein in their entirety.

TECHNICAL FIELD

The present invention relates to the authentication of natural leather and leather articles therewith.

BACKGROUND ART

Figure 1:
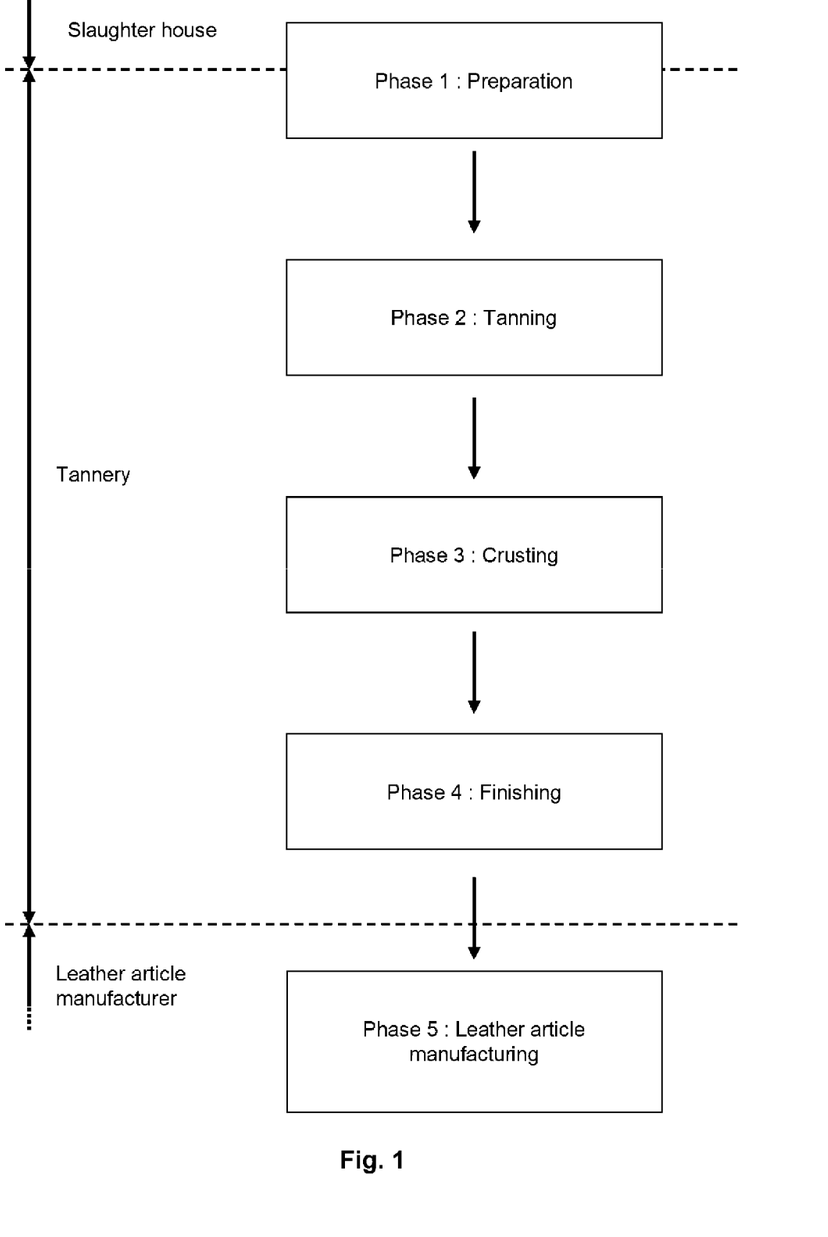
FIG. 1 shows a flow chart of the traditional manufacturing of leather articles involving the different phases and locations.

The manufacturing of natural leather articles is well known and can generally be split up in five phases as shown by FIG. 1. The preparatory phase 1 often occurs partly in a slaughterhouse and partly in a tannery, while phases 2 to 4 occur in the tannery and phase 5 occurs at a leather article manufacturer. In a first phase, the preparatory phase, the skin is removed from the animal (flaying) and pre-treated for the second phase of tanning. The pre-treatment may involve processes such as soaking, liming, unhairing, splitting and pickling (adjusting pH for assisting penetration of tanning agents). In the tanning phase, the protein of the rawhide or skin is converted into a stable material that will not putrefy. Chrome is most frequently used as tanning agent whereby the tanned product obtains a pale blue colour, therefore commonly called "wet blue". In the third phase of crusting, the tanned leather is dried and softened. The crusting often includes processes such as stripping (removal of superficially fixed tannins), fat liquoring (fats, oils and waxes are fixed to the leather fibres), dyeing, whitening, physical softening, and buffing (abrasion of leather surface to reduce grain defects). In the fourth phase, called the finishing phase, the leather is made ready for sale to leather article manufacturers. Finishing operations may include lacquer coating, polishing and embossing. In the fifth phase, a leather article is manufactured, involving processes, which may include cutting, perforating, sewing, leather wrapping, decoration and embossing.

Natural leather comprises natural markings because during lifetime animals suffer wounds and marks that affect the quality of the leather surface. Embossing with a skin texture, also called a grain, is used to hide such marks for example caused by insect bites, injuries, illness and to create an uniform skin texture. Such embossed natural leather is also called 'corrected grain'. In preparation for embossing, the natural leather is mostly sanded and then embossed with said skin texture. The embossing of the natural leather with a skin texture is mostly done after application of a top-coat on grain side of the natural leather or sanded side of the natural leather when sanded. Hot and cold embossing are well-known techniques for forming said skin texture on the top-coated natural leather. Said top-coat makes that the impressions of said skin texture last longer and make it waterproof.

Embossed natural leather is cut into leather pieces, which are sewed together into leather articles, such as shoes or handbags. Leather by itself is already perceived as a luxury product. Counterfeiting of said leather pieces is a well-known problem wherein low quality natural leather is used. Brand infringement and intellectual property infringement, such as design, results in lost sales, brand dilution loss of exclusivity and damage to business reputations of brand owners.

The use of RFID tags and/or labels with a printed code, that are attached/glued to said leather pieces, is a well-known method for authenticating said leather pieces and for track-and-tracing said leather pieces in the transport between the several stadia from cutting leather to selling a leather piece. Authentication of products is sometimes in literature also called authentication of products, which is an English corruption of the French word 'authentifier'. The printed code, such as a QR-code, may be an optical-machine-readable code, which are nowadays readable by a mobile device wherein a digital imaging device is built-in. In addition, RFID tags are readable by NFC-devices (Near Field Communication) which are nowadays also built-in mobile devices such as mobile phones. However, a counterfeiter easily makes said RFID tags and printed code. State of the art for such method is disclosed in WO2017/207524 A1 (AGFA GRAPHICS NV).

EP3388491 A1 (AGFA NV) discloses a manufacturing method of decorated natural leather by applying a base coat on crusted leather to make the leather be printable for example with inkjet technology. The method is characterized to apply one or more identification codes on crusted leather and preferably on said base coat as disclosed in [0035]. The drawback of the invention is the visibility of such identification codes which disturbs the luxury feel.

Hence, there is need for a natural leather that easily can be authenticated already in earlier stadia of the manufacturing of leather pieces, which may be used for track-and-trace leather pieces in its manufacturing process and selling process and/or for preventing copying of said leather pieces, without disturbing the luxury feeling of said leather pieces by being invisible for the human eye even at a short viewing distance.

SUMMARY OF INVENTION

In order to overcome the problems described above, preferred embodiments of the present invention enhances security of an authentication method for natural leather, more specific embossed natural leather. Said authentication method may be comprised in a track-and-trace method for said embossed natural leather or even leather pieces comprising said embossed natural leather. The embossing of the natural leather in the present invention is applying an artificial skin texture in the leather more specific in the protective top-coat.

The present invention comprises:
a) a first method for preparing a natural leather to be authenticable with an identification code by
  applying a protective top-coat on natural leather or sanded natural leather;
  selecting an identification code;
  converting said identification code to a plurality of locations, such as two-dimensional coordinates;
  forming a skin texture, thus an artificial skin texture wherein higher up-elements and lower located elements are arranged according to said plurality of locations;
  embossing said skin texture in said protective top-coat.

Said first method is thus an encoding step on a natural leather by embedding said identification code as defined in claim 10. The present invention is also a natural leather, obtained by said first method, as defined in claim 13.

b) a second method of authenticating said natural leather by:
   determining mutual locations of lower located elements and/or higher up elements in the embossed skin texture;
   determining from said mutual locations said identification code.

Said second method is thus a decoding step (FIG. 4) on a natural leather as defined in claim 1, wherein said natural leather is obtained by said first method.

Said both methods are interrelated together as an encoding- ($1^{st}$ method) and decoding-step ($2^{nd}$ method). The natural leather with embedded identification code in its skin texture is a product derived from the encoding step. The present invention is thus also a natural leather, comprising a protective top-coat on a side from the natural leather, wherein said protective top-coat comprises a skin texture, having an embedded identification code.

Said identification code is formed by the structure in said skin texture and said identification code is invisible by the human eye (without mechanical/chemical means), which means there is need for a camera system and decoding steps based on captured images to read said identification code. The structure includes a plurality of higher up elements and lower located elements. The higher up elements and/or lower located elements are preferably formed by an embossing element which is pressed against said protective top-coat and wherein a lower located element from said embossing element forms a higher up element on said protective top-coat and wherein a higher up element from said embossing element forms a lower located element on said protective top-coat. The pressure, temperature and dwell-time on said protective top-coat depends mainly on the chemistry of the protective top-coat and the characteristics of the natural leather behind it but may also be used for special effects such as deepen the lower located elements more on said protective top-coat.

The higher up elements and/or lower located elements on said protective top-coat may also be formed by an engraving method or etching method e.g. by a laser.

The identification code determined from said skin texture can then be used for authenticating or track-and-tracing said embossed natural leather or leather pieces comprising said embossed natural leather or is partly/fully made from said embossed natural leather.

The lower located elements in said protective top-coat may be point structures and/or line structures. The higher located elements in said protective top-coat may be segments which are confined by one or more of said line structures.

DESCRIPTION OF EMBODIMENTS

In a preferred embodiment of the authentication method of embossed natural leather (=decoding-method, FIG. 4) the natural leather is embossed by
   a) applying a protective top-coat on natural leather; and
   b) forming in said protective top-coat an skin texture, having an embedded identification code, by pressing against said top-coat an embossing element comprising a relief having a plurality of lower located elements and higher up elements; and
   wherein the method comprises a step of determining said embedded identification code by determining mutual locations of embossed formation by said lower located segments and/or higher up elements in said protective top-coat.

The mutual locations can be decoded by having a cryptographic key which makes it possible to determine from said mutual locations characters. Said characters form than a certain content which may be used for authentication. A character is a unit of information that may form content for authentication.

Such key is for example a look-up-table wherein a character/number is linked to a location. Or said key may for example be a function that converts a character to a location (KEY1); preferably a character combined with its position in the content to a location (KEY2); more preferably a character combined with its position in the content and a random seed for initializing a pseudorandom number generator (KEY3).

e.g. content=$\{c_1; c_2; c_3; \ldots ; c_n\}$
KEY1: $f(c_j)=(x,y)$ with $j=1 \ldots n$
KEY2: $f(c_j, j)=(x,y)$ with $j=1 \ldots n$
KEY3: $f(c_j, j, randomseed)=(x,y)$ with $j=1 \ldots n$ The cryptographic key may then be used to convert a determined location to a character; preferably to a character and position for ordering the characters in content.

Said key is sometimes also called an authentication key.

The locations are here two-dimensional coordinates where from the higher up elements and lower located elements are arranged. Using another key shall give other locations thus other arrangement of said elements. The key defines so the arrangement which makes that the embossed natural leather can be authenticated if the locations are determined in the relief and (re)converted with the key to characters.

The present invention includes also an embossing element comprising an inverse skin texture, having an embedded identification code for embossing a protective top-coat on a natural leather for authenticating said natural leather and/or for track-and-tracing said natural leather. Said inverse skin texture may also be called a negative skin texture wherein the higher up elements shall form the lower located elements in said protective top-coat and the lower located elements shall form the higher up elements in said protective top-coat. The skin texture in said protective top-coat may be called then a positive skin texture.

The embossing element maybe attached around a cylinder and preferably pressed with a determined heat on said protective top-coat. Said skin texture may also be applied in said protective top-coat by engraving or etching. The relief on the embossing element is hereby preferably a pattern, which is repeated on said protective top-coat. The pattern is preferably an endless-pattern so there are no annoying structures are embossed in said protective top-coat at the transitions of said pattern when repeated.

The protective top-coat on top of said natural leather may be dampened before applying said skin texture to make the natural leather softer and able to be compressed with said skin texture pattern.

Said higher up elements preferably comprise line structures and said lower located elements comprise segments confined by one or more of said line structures and wherein mutual locations of embossed formation by said lower located segments is used for the determination of said embedded identification code and/or said higher up elements preferably comprise point structures and wherein mutual locations of embossed pores by said higher up point structures is used for the determination of said embedded identification code.

In a preferred embodiment, there are minimum two identification codes; one identification code is embedded in mutual locations of said pores and the other is embedded in the mutual locations of said segments. A combination of said plural identification codes makes it possible to enhance anti-copying features of leather articles made from said natural leather. The application of said segments or pores may be performed by a different method. Preferably said segments and line structures with pressing an embossing element against said protective top-coat and said pores with an engraving technology, such as laser in said protective top-coat. The use of a laser makes it possible for varying the identification code easily for example according the date of manufacturing and/or selling agent and/or other content as disclosed further under Chapter "Identification Code".

In a preferred embodiment, the mutual surfaces of embossed formation by said lower located segments is additionally used for the determination of said embedded identification code and/or shapes of embossed formation by said lower located segments is additionally used for the determination of said embedded identification code and/or depth of embossed formation by said higher up elements is additionally used for the determination of said embedded identification code. Surfaces of embossed formation by said lower located segments below a determined surface, such as smaller than 1 mm$^2$, may be neglected in the determination for said embedded identification code.

In a preferred embodiment, said mutual locations forms a two-dimensional code comprising said embedded identification code or forms an image as embedded identification code. Said image or two-dimensional code may be used for pattern comparing against a pre-selected key pattern for authenticating said natural leather or leather article. If there is no match with said pre-selected key pattern, the natural leather or leather article is fake or a fraudulent imitation.

The authentication method comprises for the determination of said mutual locations the following steps:
 a) capturing a digital image from said embossed natural leather by a camera; and
 b) digital filtering from said digital image said embossed formation; and
 c) determining from said filtered digital image said mutual locations.

A location is typically a two-dimensional coordinate but if the depth is taken into account for determining the identification code, the location may also be a three-dimensional coordinate wherein capturing a digital image is capturing a digital image whereof three-dimensional coordinates can be determined.

A preferred embodiment of the embossing method for authenticating natural leather with an identification code comprises preferably the steps:
 applying a protective top-coat on said natural leather; and
 selecting content and coding said content to a plurality of locations; and
 forming a skin texture with higher up elements and lower located elements; arranged according said plurality of locations; and
 embossing said skin texture in said protective top-coat.

Said higher up elements are preferably line-structures and/or point structures and said lower located elements are preferably segments confined by one or more of said line structures; and wherein said point structures and/or segments are arranged according to said plurality of locations.

In the present invention is said natural leather, having a grain side, preferably first sanded on said grain-side before the application of said protective top-coat. The skin texture is preferably selected from a skin texture group consisting of cow, pig, goat, sheep, horse, elephant, crocodile, snake and fish. The natural leather may also be decorated leather as disclosed further under chapter 'Decorated leather'.

In the present invention, the natural leather is a leather article selected from the group consisting of footwear, furniture, upholstery, bags, luggage, gloves, belts, wallets, clothing, automotive leather seats, interior decoration, packaging, equestrian leather articles, books and stationary.

Identification Code

The identification code applied in the protective top-coat by the present invention is a code whereof the content is not readable fast by a human eye without mechanical/chemical means and the identification code is hardly noticeable by said human eye because it is hidden in mutual locations of relief elements: higher up—and/or lower located elements, else it should disturb the luxury feeling and it should be easy to counterfeit. The identification code is hereby a machine-readable identification code. But the identification code is not to be any kind of printed QR-code or bar-code as disclosed in EP3388491 A1 (AGFA NV) because this disturbs the luxury feeling of leather articles. Examples of such printed QR-codes are disclosed in said state-of-the-art in FIG. 6. The content is embedded in the relief, more specific in the artificial skin texture, which makes the present invention has a better anti-forgery feature which is not visible on leather pieces.

For authenticating the leather, the present invention may comprise the following steps:
 a) detecting a pattern in a skin texture, especially the higher up and/or lower located elements, by a pattern detecting device; and
 b) extracting said pattern by a pattern extracting device; and
 c1) comparing said extracted pattern by a pattern matching device if it match a certain pattern, also called a key pattern; which is an identification code or c2) decoding said pattern by a pattern decoding device for getting an identification code.

If for step c1 there is a degree of resembles, the natural leather is not a fake natural leather or not a fake leather article.

Said detected pattern is in the present invention formed by the mutual locations of said higher up and/or lower located elements. Said detected pattern may form a certain pattern by extracting from the detected pattern. Said extracted pattern may be then compared to a key pattern to acknowledge if the natural leather is fake or not. The present invention may use a pattern recognition method for detecting a certain pattern in the mutual locations of said higher up and/or lower located elements. Said pattern recognition method may be comprising artificial intelligence and machine learning, whether or not together with data mining and knowledge discovery in databases.

The identification code can be used for identifying a natural leather manufacturer, a tannery, decorated leather manufacturer, leather article manufacturer, even the animal whereof the natural leather came from . . . . The identification code allows for verifying the authenticity of a leather article, such as an expensive luxury handbag, by taking an image of the skin texture and decoding from it the identification code. Said decoding method may be performed with a mobile device such as a smartphone similar as a QR-code decoding method. The identification code allows then to connect to a website showing pictures of said leather article that are stored in a database where they are retrievable by the identification code. The identification code in the present invention is hidden for the human eye without using mechanical and chemical means, so the luxury effect maintains in leather articles. The identification code may be combined of course with printed identification code preferably located inside said leather article.

It should be clear that the identification code can be used for multiple reasons, such as identifying a leather article to be manufactured for a customer with the decorated natural leather; cutting the decorated natural leather; identifying the customer of the leather article; authentication of the leather article; and delivering the leather article to the customer.

The identification code can be used for track-and-trace purposes throughout the manufacturing chain in both the tannery and the leather article manufacturer, and even in the delivery from the factory of the leather article manufacturer to the shop where it was ordered or the home of the customer. If multiple factories of one or more leather article manufacturers are involved, then the identification code can be efficiently used in the logistics process for getting the inkjet printed leather to the correct factories.

The identification code can be useful after the leather article was delivered to the customer, for example, for checking the authenticity of the leather article. This is mainly of importance for expensive leather articles from exclusive manufacturers like Gucci™ or Louis-Vuitton™. The identification code may also be used to order an exact replica of the leather article at the original manufacturer or to get a lost or stolen leather handbag back to its rightful owner.

The identification code may also serve for marketing purposes, such as customer engagement. Customer engagement is a business communication connection between an external stakeholder (consumer) and an organization (company or brand). The connection can take place online or offline. Preferably, the connection is made online, for example, when the external stakeholder scans the identification code with his smartphone and is taken to a certain website of the organization to enhance the overall customer experience.

The advantage of the present invention is that even after cutting a natural leather manufactured by the encoding method and sewing cutted leather together into leather articles, the identification code can still be read if all used natural leather is prepared with the same skin texture. Different skin textures with different identification codes may also used for example one pattern for the front of a luxury handbag and another pattern for the back of said luxury handbag.

During transport of several natural leathers, the identification code can be used for delivering said natural leathers to the customer. The machine readable identification code can be scanned during the transport process for enabling the customer to track the progress of delivery of said natural leathers. If the customer is a natural leather shop, then the shop can use the identification code for informing the end-customer if the natural leathers have already been manufactured or are in transport.

The identification code may comprise content whereby the reader of said content know how to sew the natural leather or maintain the natural leather.

Natural Leather

Natural leather comes in different grades (see FIG. 2), such as full grain (34), top grain (35) which is essentially full-grain but with part of the grain layer sanded and the underlying split layer removed, and split leather (36). For the latter, the underlying layer of the hide is removed and used to create split leather. Depending on the thickness of the underlying layer, many splits can be created. Split leather has a rough appearance and is usually used to make suede.

Figure 2:
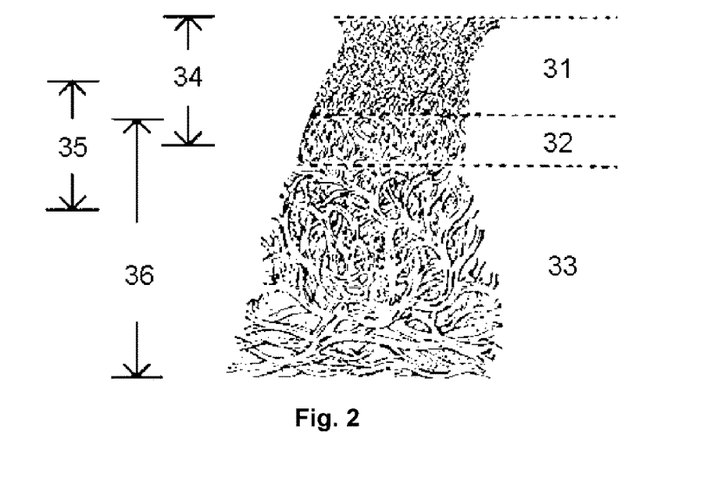
FIG. 2 shows schematically a cross-section of an animal skin including a grain (31) and a corium (33) separated by a junction of grain and corium (32). The different leathers made from the animal skin include full grain leather (34), top grain leather (35) and split leather (36).
Figure 3:
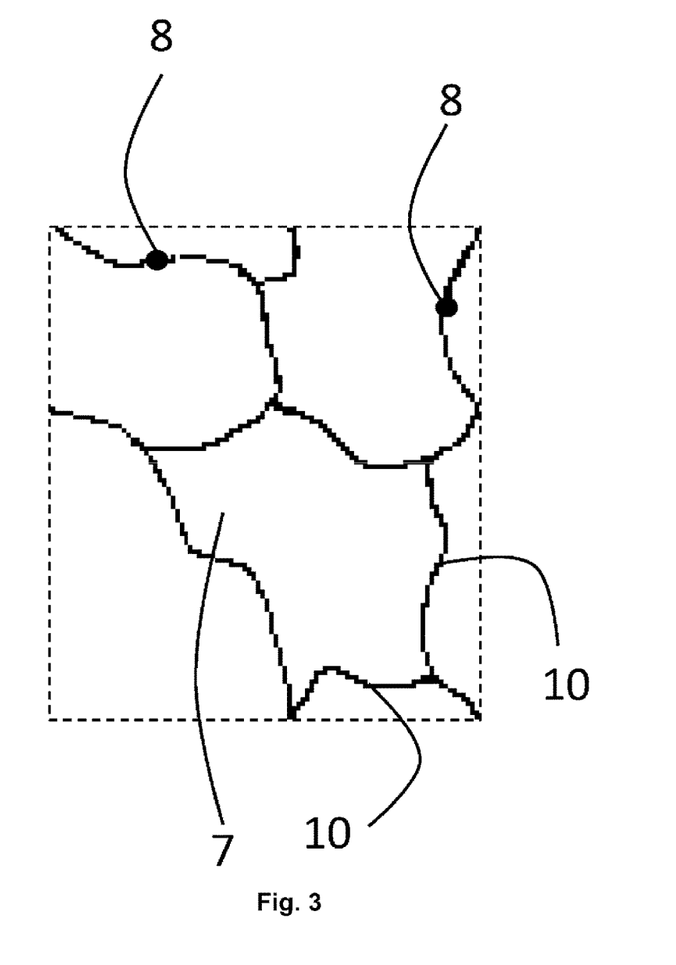
FIG. 3 shows higher up elements and lower located elements in an embossed leather. The lower located elements are line structures (10) and point structures (8). The higher-up located elements (7) are in this figure confined by said line structures (10).

31 Grain
32 Junction of grain and corium
33 Corium
34 Full grain leather
35 Top grain leather
36 Split leather For preventing grain damage and weakness, the hide or skin is tanned preferably by chrome, but other tanning methods such as vegetable tanning may also be used. After tanning, the leather is dried and softened into so-called crusted leather. The crusting may include processes such as stripping (removal of superficially fixed tannins), fat liquoring (fats, oils and waxes are fixed to the leather fibres), dyeing, whitening, physical softening, and buffing (abrasion of leather surface to reduce grain defects).

Natural leather may be used for manufacturing a wide range of leather articles. Preferred leather articles include footwear, furniture, upholstery, bags and luggage, gloves, belts, wallets, clothing, automotive leather (e.g. train, plane, boat and car seats), interiors, books and stationary, packaging, purses, briefcases, equestrian articles and the like.

Said natural leather may also be dyed with a color and/or may be decorated by an inkjet printed decorative image to become a decorated natural leather as disclosed further on.

Top-Coat

The top-coat, preferably a protective top-coat, is usually optimized according to the leather application. For example, flexibility does not play an important role for a leather book cover contrary to leather shoes. Hence, the top-coat for a book cover may be optimized towards scratch resistance.

The top-coat preferably includes a cross-linker and a polymer or copolymer based on polyurethane and/or polyamide for protecting said natural leather against water and/or scratches or for allowing easier care of said natural leather.

The top-coat preferably includes a polymer or copolymer based on polyurethane as this is beneficial for the flexibility of the printed leather. A polyamide polymer, which is found to have a high compatibility with a polyurethane binder, is preferably included if the scratch resistance needs to be improved.

Suitable polyurethanes include Urepal™ PU147 and PU181 from CHEMIPAL S.p.A.; Melio™ Promul 61 from STAHL; Astacin™ Finish PS from BASF; Ecrothan™ 4075, 4078 and 4084 from MICHELMAN; Incorez™ CS8073 and CS065-195 from INCOREZ. The dry weight of the polyurethane in the top-coat is preferably in the range of 1 to 6 g/m$^2$.

Suitable polyamides include the PA emulsion types ED310 and 161148 CX from MICHELMAN. The dry weight of the polyamide in the base coat is preferably less than 7 g/m$^2$, more preferably less than 5 g/m$^2$.

Although polyurethanes and/or polyamides are preferred as the polymers for the base" coat, other polymers may be used preferably in combination with the polyurethanes and/or polyamides. Such polymers preferably have an elongation at break of more than 200%, more preferably 300%. The elongation at break is measured according to ISO527-2, for example, with a MTS Exceed™ testing apparatus from MTS Systems Corporation.

A suitable polymeric acrylate emulsion is Bioflex™ KGA from LMF Biokimica.

A cross-linker may be incorporated in the top-coat to improve the scratch resistance. Preferred cross-linkers include those mentioned above for the base coat. The dry weight of the cross-linker in the top-coat is preferably less than 1.4 g/m$^2$, more preferably less than 1.0 g/m$^2$.

The protective top-coat may be applied by spraying, padding, screen printing or preferably by a digital printing technology, more preferably by inkjet printing for local applying a protective top-coat for example.

If a matt top surface is desired a matting agent may be included. Any suitable matting may be used. Preferred matting agent include silica. A preferred commercially available example of a silica dispersion is Euderm™ SN2 from LANXESS.

Decorated Leather

Natural leather has been decorated with an image in the past by screen printing. However, screen printing is labour intensive and for each colour an individual screen is required. This is costly and time consuming, especially when personalization or customization is desired.

Digital printing technologies on finished leather have been investigated but many solutions on finished leather remain of inferior quality. Inkjet technologies from textile printing employing heat transfer paper have been explored for leather printing. However just like inkjet printing directly onto natural leather, it was found that a process of inkjet printing dye-based images onto a sheet of transfer paper and then transferring the images onto tanned leather by heat resulted in a quality unacceptable for many luxury leather products. Examples of such inkjet processes are disclosed in WO 01/32434 A (GILHAM) and US 2016067984 A (CHUNG). Aspects such as image quality, light fading of transferred dyes and scratch resistance needed further improvement.

Recently high quality decorated leather has been obtained by a method of printing "into" tanned leather with pigmented inks. WO 2013/135828 A (CODUS) discloses a method of printing into tanned leather comprising the steps of a) applying ink acceptor directly to the surface of the natural leather; b) applying ink directly onto the acceptor by inkjet; c) applying an additive to the ink; d) heating a surface of a barrier which is substantially impervious to the ink; and e) contacting the heated barrier with the ink acceptor, additive and ink on the natural leather surface directly to soften the additive, ink acceptor and ink into the natural leather such that the ink penetrates into the natural leather.

The application of a protective top-coat on a decorated leather, especially decorated with an image by inkjet technology and adding a skin texture in said protective top-coat makes that the image, as layer, is better adhered to the grain side of the natural leather and better protected for scratches and/or wear and/or liquids such as water. The embossing with said skin texture devisualizes noise in said inkjet printed image caused by the halftoning method. The embedded identification code from the present invention may comprise content that is linked to said image and/or linked to the manufacturer of said decorated leather and/or linked to the leather article comprising said decorated leather. Such identification code may then be used for authentication, for track-and-trace or for anti-copying said leather article.

For decorated leather, there are methods for verifying authenticity of a digital printed substrate but a trained authentication inspector is needed to seek deviations in color, sharpness or incorrect positions of printed objects in relation to other objects or deviations in fine patterns such as contrast. However, a printed article can be scanned with a high-resolution image scanner nowadays so it is becoming hard for trained authentication inspector to distinguish a copy of the digital printed substrate from an original of the digital printed substrate.

To enhance robustness of authentication the present invention may be combined with authentication method for digital printed substrates, such as decorated leather. Said authentication method preferably comprises:

a) image scanning the decorated leather to obtain a digital image of the decorated leather, b) retrieving reference data of the decorated leather, the reference data comprising a reference image of an authentic one of the decorated leather, the authentic one of the decorated leather comprising a noise pattern in at least two colour channels, c) determining a test noise parameter from the digital image of the decorated leather, wherein the test noise parameter reflects a noise pattern in at least two colour channels of the digital image of the decorated leather, d) determining a reference noise parameter from the reference image, wherein the reference noise parameter reflects the noise pattern in the at least two colour channels of the reference image, e) comparing the test noise parameter to the reference noise parameter thereby deriving, from a difference between the test noise parameter and the reference noise parameter, a noise pattern change as a result of a colour modulation change per raster point between the at least two colour channels of the digital image of the decorated leather and the at least two colour channels of the reference image of the decorated leather, and f) determining an authenticity of the decorated leather from a result of the comparing, thereby determining the authenticity from the noise pattern change as a result of the colour modulation change per raster point.

According to said preferred embodiment, a digital image of the decorated leather is made. The digital image may be made by any suitable image capturing device, such as a digital camera preferably comprised in a smartphone. A reference image of the decorated leather is stored in a database. The reference image provides an image of the original item; the reference image may be a digital image of the original item or may be an image file derived from a master file with which the original item was created. A noise parameter of the digital image is determined. The noise parameter may be formed by any parameter that expresses a noise level contained in the digital image. Likewise, a noise parameter of the reference image is determined. The noise parameter of the reference image may have been pre-calculated and stored in the reference database, or may be determined when needed. The noise parameter of the reference image is compared with the noise parameter of the digital image of the decorated leather. The noise parameters relate to noise that is invisible to a human eye, i.e. noise that the human eye using normal eyesight—i.e. without using tools such as optical or computer magnification, digital filtering, etc.—will not or substantially not see, as the spatial frequency and amplitude are outside a range of observation of the human eye. The noise pattern may be present in the authentic decorated leather in a form of quantisation noise, or may be an added noise pattern, such as a pseudo random noise pattern or a random noise pattern that has been inserted in a printing pattern of the decorated leather. The noise pattern reflects a raster point to raster point variation in colour, and possibly a raster point to raster point variation in intensity. The raster may be a screen print raster or any other printing raster. The noise pattern may be presented in two or more colour channels of the authentic one of the decorated leather, e.g. may be provided in a digital master file from which the authentic decorated leather is printed in a printing process.

Said preferred embodiment is based on the insight that a copy of a decorated leather will be made using a copying process that starts from an original item. In such a copying process, a new digital master file may be created that provides a copy of a design of the decorated leather. The unofficial digital master file will be created from an original item. Thereto, the original item will be scanned by a scanner or a sampling of its exterior will be made otherwise (by photographing, scanning, or any other suitable capturing technique). A (spatial) sampling rate of the scanner or other device used in the copying technique, will be different from a sampling rate as applied in the original digital master file. Also, the sampling rate if the scanner or other device used in the reproduction printing technique will be different from a resolution as applied in a reproduction technique (e.g. a digital printing process) that was applied to create the original item from the original digital master file. Their differences in sampling rate will translate into aliasing effects during the copying process. Also, image processing as applied in the copying process may require filtering in order to suppress aliasing effects. For example, the original master file may be formed by a CMYK file (CMYK being an abbreviation of Cyan, Magenta, Yellow and black) and representing a file format in common printing process colors CMYK). The scanning equipment as applied during the copying process may generate an RGB file, as its imaging sensors commonly detect the colours R (red), G (green) and B (blue). Thus, the copying process may require the conversion of obtained RGB data into CMYK data required to print copies of the decorated leather, such conversion may require filtering to suppress aliasing effects.

In order to at least reduce such aliasing effects, filtering will normally be applied in the copying process, i.e. in the generation of a "reconstructed" master file used in the printing process of the printing of the copy of the decorated leather. The inventor has realised that such filtering will not only translate into a reduction of aliasing effects, however will also result in a reduction of noise. Furthermore, the inventor has realised that a distinction between an original of the decorated leather and a copy of the decorated leather can hence be made by comparing noise parameters.

Furthermore, when printing an item, combinations of ink of different colour channels (e.g. Cyan, Magenta, Yellow and black) will result in mixing colours so as to create colour tones of a colour palette. In the re-sampling process of creating the copy, the different colour channels would need to be retrieved from these mixed colours comprised of different colour channels (colour rasters of the different colour channels would need to be derived from a scanned image). Visually highly similar colour may be obtained from different combinations of colour channels. As a simple example: black may be obtained from K or from a mixture of C, M and Y. As another example, violet is obtained from 40% magenta and 60% cyan, while slightly different mixtures, such as 40.5% magenta and 59.5% cyan will result in a visually same colour.

Skin Texture

A skin of a mammal has a typical texture on its skin. After the leather making process said typical texture is still visible. Other animals, such as reptiles, birds and fishes, have also a typical texture, which, after making leather from it, has still a visible texture. Leather experts can even detect the origin of leather based on said typical texture.

A skin texture is a relief, which includes higher up elements and lower located elements.

Natural leather comprises natural markings because during lifetime animals suffer wounds and marks that affect the quality of the leather surface. Embossing with a skin texture is used to hide such marks for example caused by insect bites, injuries, illness and to create an uniform skin texture. Such embossed natural leather is also called corrected grain. It is known that a skin texture from a certain animal is sometimes embossed in a leather from a skin of another animal.

A skin texture is preferably selected from a skin group consisting of bovine pattern, also called cowhide pattern, calfskin pattern, pigskin pattern, hogskin pattern, goat skin pattern, kidskin pattern (from young goat), sheet skin pattern, lamb skin pattern, deerskin pattern, bison skin pattern, also called buffalo skin pattern, ostrich skin pattern, emu skin pattern, crocodile skin pattern, alligator skin patter, cayman skin pattern, snake skin pattern, eel skin pattern, fish skin pattern, stingray skin pattern and shagreen pattern.

Most skin textures have line structures as lower located elements and segments confined by one or more line structures as higher up elements. For skin textures from mammals said lower located elements may also have point structures, which are pores in a skin.

The embossing of said skin textures is mainly done by pressing a relief embossing element against a protective top-coat; wherein said embossing element has a relief representing a real skin texture. Other methods of applying a skin texture is engraving or etching.

In the present invention, an artificial skin texture is applied in the protective top-coat of the natural leather. Said artificial skin texture represents a skin texture from said skin group. The artificial skin texture may be combined with a real skin textures, for example if the identification code can be determined only from the pores. The pores may be an artificial skin texture and line structures may be a real skin texture. The skin texture may be embossed by a first embossing element for the pores and may be additional be embossed by a second embossing element with the line structures and the segments. The first relief may have an embedded identification code and said second relief may have another embedded identification code.

The identification code in the present invention is based on mutual locations of relief structures such as lower located or higher up elements; which forms a skin texture. The identification code, having a content, is in the present invention converted to a plurality of locations and the skin texture is formed with higher up elements and lower located elements; arranged according said plurality of locations.

Artificial Skin Texture

The forming of said skin texture preferably comprises a step of dividing a plane in parts according said plurality of locations; more preferably comprises a step of applying a Dirichlet tessellation on a plane for dividing said plane in parts, also called Dirichlet regions; most preferably comprises a step of applying a Voronoi diagram on a plane for dividing said plane in parts, also called Voronoi cells. Given a set S of n points in $IR^d$, called sites, the Voronoi diagram of S is a partition of space into cells, such that each cell is the region of space consisting of all points that are closer to a particular site than to any other. Said plane has in the present invention the same dimensions/shape of the natural leather or a part of it. Said plane is preferably a repeatable pattern that can be repeated in X-dimension and/or Y-dimension according the Cartesian coordinate system with disturbing artefacts at the edges of said plane. The pattern is thus constructed with explicit "wraparound" properties as for example is known in halftoning threshold techniques.

The plurality of locations preferably comprises a repeating pattern whereof the identification code can be determined.

Shape and surface of such part may vary by applying supplementary parameters, such as using a weighted Voronoi diagram or more preferably an approximate Voronoi diagram where the Voronoi cells have a fuzzy boundary, which can be approximated. Said supplementary parameters may be changing locally in said plane to have enough shape variances in said parts but the locations of said parts remain according said plurality of locations and/or by adding a small position error on said locations enough shape variances in said parts are possible but the locations of said parts remain according said plurality of locations. It is found that adding small noise on a part or all locations of said plurality of locations may help to make the variances larger but said small noise may not be exaggerated, else it becomes difficult for the decoding of the natural leather or the leather article made of said natural leather. Said small noise is preferably between −1 mm and 1 mm in X and/or Y-direction, according to the Cartesian coordinate system.

Said parts, such as said Dirichlet regions, forms then segments confined by one or more line structures, such as a Voronoi edge. From said plurality of locations, determined by image capturing the skin texture, an identification code is determined by the present invention. If said plurality of locations comprises repeating pattern said determination can be determined fast.

Additionally, on said plane a plurality of pores according another plurality of locations may be added. From said other plurality of locations, determined by image capturing the skin texture, an identification may be determined by the present invention.

Once the artificial skin texture, with embedded identification code, is determined, the pattern may be applied with the embossing by pressing it again said protective top-coat for forming said skin texture.

Preferably, from the identification code a pseudo-random set of locations is determined instead of an identification code, which is a two-dimensional pattern whereof a set of locations can be determined. The pseudo-randomness is important to determine said skin texture to resemble with real skin textures, which are evolved randomly by living, nature and DNA. Said set of locations forms preferably a repeating pseudo-random pattern, such as a pattern comprising blue noise. Said repeating pattern can easily be recognized by pattern recognition and if said pattern is small, only a part of the natural leather has to be image captured for the detection of said identification code. Pattern recognition may be using a conversion to space frequency domain for fast recognizing a pattern or fast detecting resembles with a key pattern.

A method of creating pseudo-random set of locations is disclosed in EP1737211 A1 (AGFA-GEVAERT) by using a single value function for creating binary threshold tiles in the field of halftoning at [0095]-[0129]. For a threshold tile the whole tile is filled in but for the present invention the 'loop of the computer implemented method' is stopped if enough pseudo-random set of locations are found.

The use of space frequency domain for determining an identification code may be done by using radially average power spectrum on the determined locations, which gives a one-dimensional signature where of the identification, can be determined. If said determined radially average power spectrum is for example not homogeneous, then there is no correlation between said locations so also no identification code. From said one-dimensional signature an identification code can be determined for example by comparing it with other homogeneous patterns. Said radially average power spectrum is a known technique in halftoning to determine the (a)periodicity of a pattern.

Decoding Identification Code

Figure 4:
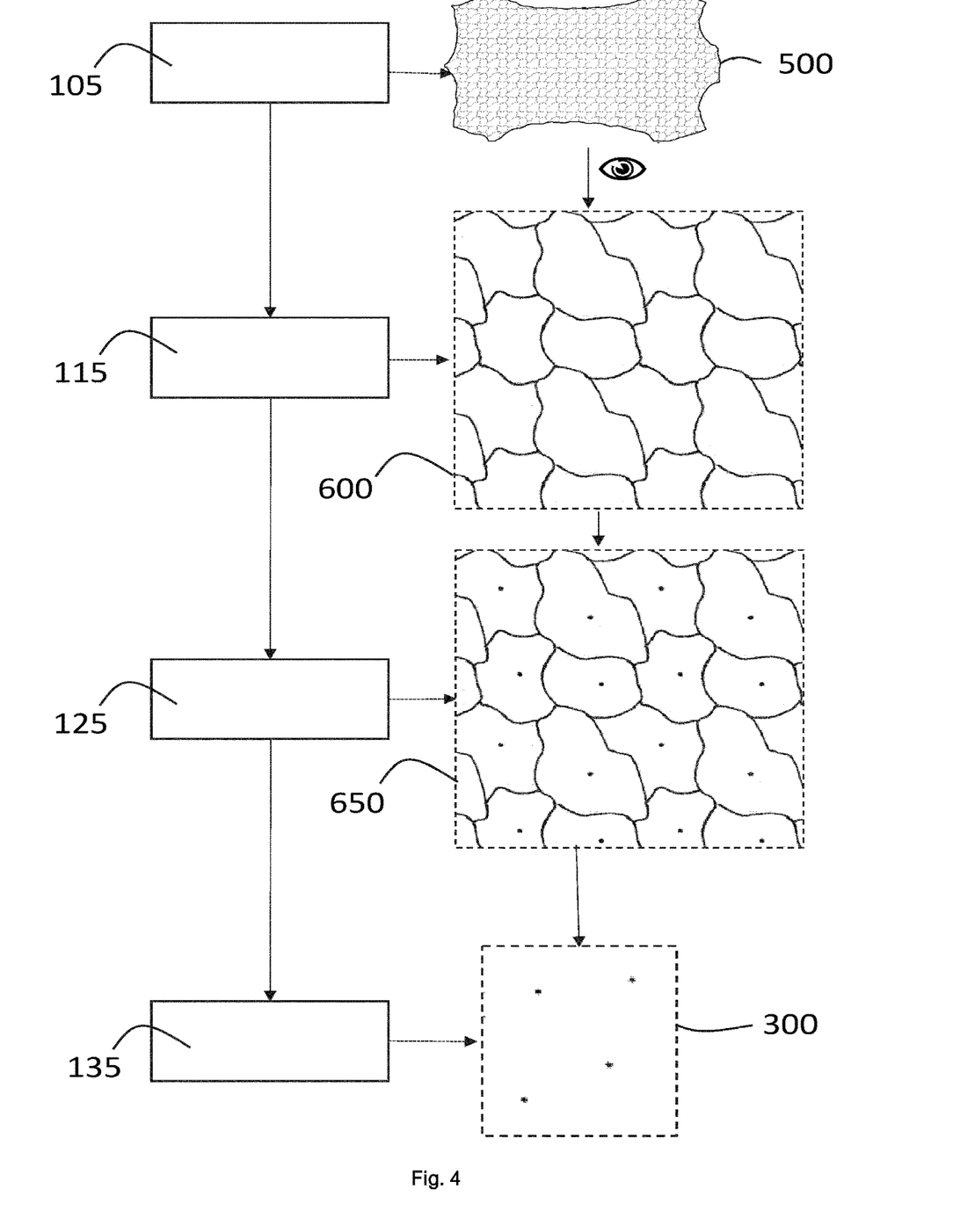
FIG. 4 is a representation in flowchart from a preferred embodiment how the natural leather is authenticated by determining the identification code.

The present invention is an authentication method (FIG. 4) for embossed leather which preferably comprises for the determination of said mutual locations the following steps:

a) capturing a digital image from said embossed natural leather by a camera; and b) digital filtering from said digital image said embossed formation; and c) determining from said filtered digital image said mutual locations.

If the capturing is a two-dimensional digital image the relief of the embossing may easily be determined by the effect of contrast they give in a captured digital image. For example image-embossing filtering may be used for detection said relief and thus the embossed formation. Image-embossing filtering is a computer graphics technique in which each pixel of an image is replaced either by a highlight or a shadow, depending on light/dark boundaries on the original image. Low contrast areas are replaced by a gray background. The filtered image will represent the rate of color change at each location of the original image. The contrast formed by the relief in an captured two-dimensional digital image results in light/dark boundaries in said filtered image, whereof the locations of lower and/or higher up located elements can be determined in said skin texture.

Said image-emboss filtering is also called a directional difference filter. It will enhance edges in the direction of the selected convolution mask(s). The process yields an embossed image with edges highlighted.

Embossing Element

The manufacturing of an embossing element, having an inverse artificial skin texture may be manufactured by etching or engraving on a plate, preferably a metal plate. An embossing element is preferably a plate having a relief used for embossing said relief inverse an object. Said plate is sometimes called a die. Manufacturing an embossing element from a skin texture is well-known in the state-of-the-art. The embossing element may also be manufactured by a 3D-printer wherein the relief is determined by layering. The depth in such embossing element is preferably between 5 μm and 5 mm, more preferably between 10 μm and 50 μm. The depth depends on the kind of natural leather and a selected skin texture from the skin group disclosed above.

There is also no limitation on the type of metal used as initial substrate for the embossing element. However, for embossing a protective top-coat on a natural leather, preferably stainless steel is used. Depending on the skin texture and natural leather and protective top-coat, other suitable metals include aluminium, brass, copper, inconel, manganese, nickel, silver, steel, zinc and titanium. It should be clear that the term metal here is used to include alloys.

Said formed skin texture may be a binary two-dimensional pattern (on/off) which results after manufacturing said embossing element in a single-level die for changing the relief on said natural leather and its protective top-coat with one level (on=higher up; off=lower located or vice-versa). Preferably said formed skin texture may be a multilevel pattern, which results after manufacturing said embossing element in a multi-level die for changing the relief on said natural leather and its protective top-coat with multiple levels. Said multiple levels corresponds to the levels in said pattern.

The formed skin texture may be a 2D vector image for forming single-level die or a 3D vector image for forming a multi-level die or sculptured die.

From a binary two dimensional pattern; which may be determined from said 2D vector image by a raster image processor (RIP); also a multilevel die or sculptured die may be manufactured as disclosed in US20040183796 (AGFA-GEVAERT NV).

The embossing in the present invention may be hot embossing by using a hot embossing element. The embossing may also done by a roll press wherein the embossing element is attached to the circumference of a cylinder. Such embossing element is also called an embossing roll. The embossing element may also be attached to a belt or preferably an endless belt.

EXAMPLES

Figure 5:
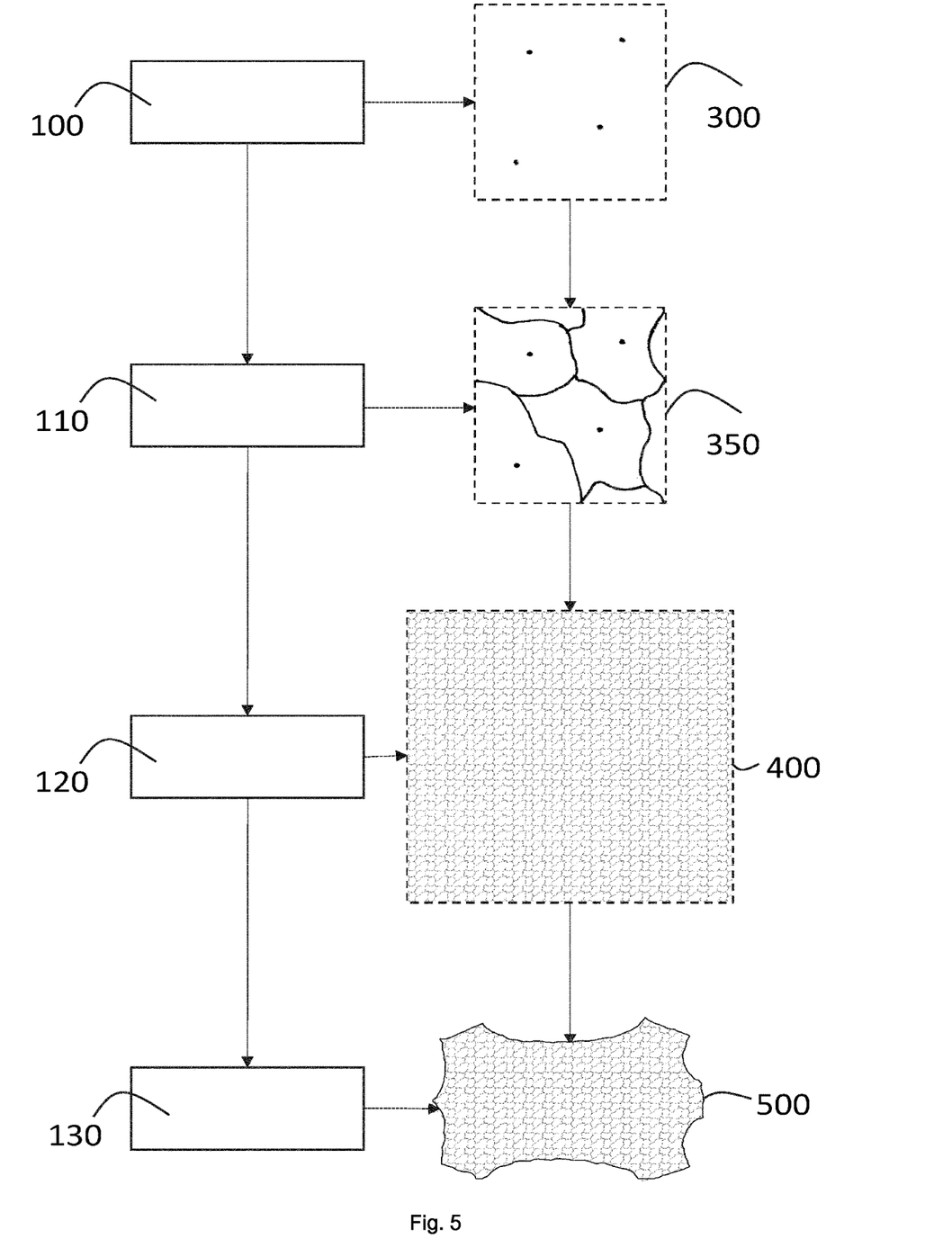
FIG. 5 is a representation in flowchart from a preferred embodiment how the natural leather is embossed with a skin texture comprising an identification code. The flowchart of FIG. 4 may be followed after said embossing.

FIG. 5 is a representation in flowchart from a preferred embodiment how the natural leather is embossed with a skin texture comprising an identification code.

STEP 100: An identification code is selected: "AGFA" from a table (not visible) for each letter ('A', 'G', 'F', 'A') a position in a quadrant (not visible) from a determined space can be determined so from said position a two-dimensional image (300) with certain dimensions is generated from said 4 locations, one in each quadrant of said determined space. The coding from the characters, here letters, to locations is preferably done by a cryptographic key which converts characters to said locations. Said key may be a look-up-table.

STEP 110: From said 4 locations segments are formed confined by one or more line structures. The pattern is a repeat pattern (350) which can be repeated in both directions (X,Y) without annoying effects on edges. The 4 locations forming the centre of said segments.

STEP 120: A large embossing element (400) is manufactured wherein said repeat pattern (350) is several times repeated in X and Y directions wherein the line structures forming higher up elements in the generated skin texture.

STEP 130: Said large embossing element (40) is then pressed onto a top-coated natural leather for forming an embossed natural leather (500).

FIG. 4 is a representation in flowchart from a preferred embodiment how the natural leather is authenticated by determining the identification code.

STEP 105: An embossed natural leather (500) is selected which is partly image captured (eye-symbol) by a camera (not visible).

STEP 115: The captured image is filtered with a directional difference filter. From said image filtered image (600) the relief and its line structures and segments confined by said line structures is determined.

STEP 125: From said segments, the centrums are determined. The centrums are visualized by a point in said filtered image (650)

STEP 135: from said centrums, a repeat pattern (300) is determined by determining radially average power spectrum from said determined centrums. From said repeat pattern (300) the identification code can be determined for authenticating the embossed natural leather.

The invention claimed is:

1. An authentication method for embossed natural leather wherein the natural leather is embossed by a process comprising:
    a) applying a protective top-coat on natural leather; and
    b) pressing against the protective top-coat an embossing element, the embossing element comprising a relief having a plurality of lower located elements and higher located elements to form in the protective top-coat an artificial skin texture, the artificial skin texture having an embedded identification code; wherein the higher located elements comprise line structures and the lower located elements comprise segments confined by one or more of the line structures; and
    wherein the authentication method comprises:
    a decoding step comprising a step of determining the embedded identification code by determining mutual locations of the embossed formation by the lower located elements and/or higher elements in the protective top-coat; and
    converting the determined mutual locations to a plurality of characters for authenticating the embossed natural leather;
    wherein the mutual locations of the embossed formation by the lower located segments is used for the determination of the embedded identification code.

2. The authentication method according to claim 1 wherein the conversion of the determined mutual locations to a plurality of characters is performed by a cryptographic key.

3. The authentication method according to claim 2 wherein the higher located elements comprise additional point structures and wherein the mutual locations of embossed pores by the higher located point structures is used for the determination of the embedded identification code.

4. The authentication method according to claim 2 wherein ratio between the mutual surfaces of the embossed formation by the lower located segments is used for the determination of the embedded identification code.

5. The authentication method according to claim 2 wherein the shapes of the embossed formation by the lower located segments are used for the determination of the embedded identification code.

6. The authentication method according to claim 2 wherein the depth of the embossed formation by the higher located elements is used for the determination of the embedded identification code.

7. The authentication method according to claim 2 wherein the determination of the mutual locations comprises:

a) capturing a digital image of the embossed natural leather by a camera;
b) digital filtering from the digital image the embossed formation; and
c) determining from the filtered digital image the mutual locations.

8. The authentication method according to claim 1 wherein the higher located elements comprise additional point structures and wherein mutual locations of embossed pores by the higher located point structures are used for the determination of the embedded identification code.

9. The authentication method according to claim 8 wherein the higher located elements comprise additional point structures and wherein the mutual locations of embossed pores by the higher located point structures is used for the determination of the embedded identification code.

10. The authentication method according to claim 8 wherein ratio between the mutual surfaces of the embossed formation by the lower located segments is used for the determination of the embedded identification code.

11. The authentication method according to claim 8 wherein the shapes of the embossed formation by the lower located segments are used for the determination of the embedded identification code.

12. The authentication method according to claim 8 wherein the depth of the embossed formation by the higher located elements is used for the determination of the embedded identification code.

13. The authentication method according to claim 8 wherein the determination of the mutual locations comprises:
a) capturing a digital image of the embossed natural leather by a camera;
b) digital filtering from the digital image the embossed formation; and
c) determining from the filtered digital image the mutual locations.

14. The authentication method according to claim 1 wherein the ratio between the mutual surfaces of the embossed formation by the lower located segments is used for the determination of the embedded identification code.

15. The authentication method according to claim 1 wherein the shapes of the embossed formation by the lower located segments are used for the determination of the embedded identification code.

16. The authentication method according to claim 1 wherein the depth of the embossed formation by the higher located elements is used for the determination of the embedded identification code.

17. The authentication method according to claim 1 wherein the determination of the mutual locations comprises:
a) capturing a digital image of the embossed natural leather by a camera;
b) digital filtering from the digital image the embossed formation; and
c) determining from the filtered digital image the mutual locations.

* * * * *